Sept. 22, 1953 J. VISSER 2,652,944
ASH RECEIVER
Filed July 29, 1947 2 Sheets-Sheet 1
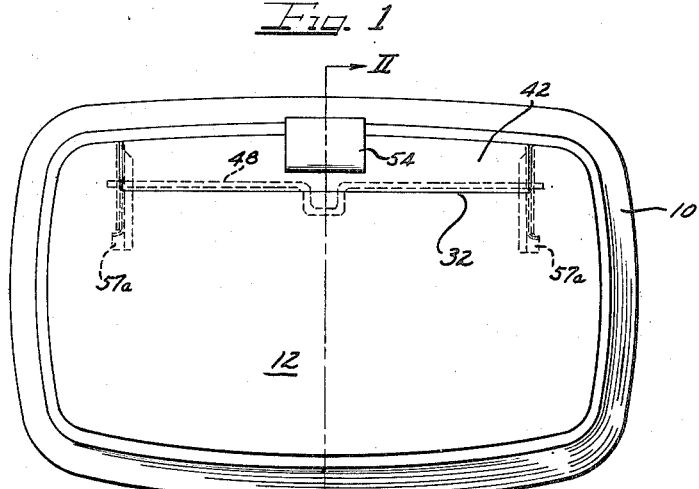
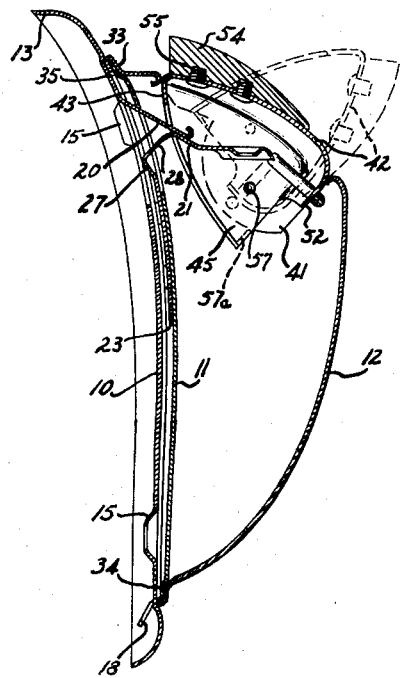
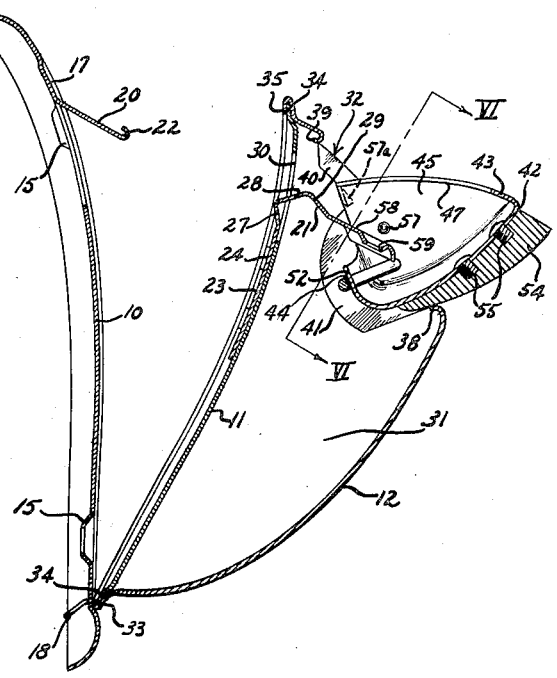
Inventor
JOHN VISSER Sept. 22, 1953 J. VISSER 2,652,944
ASH RECEIVER
Filed July 29, 1947 2 Sheets-Sheet 2
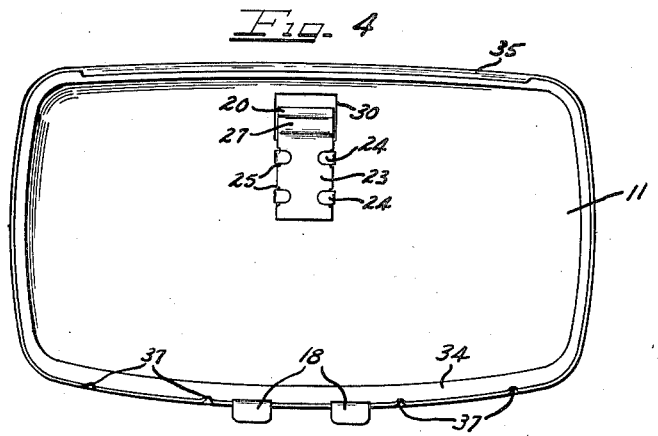
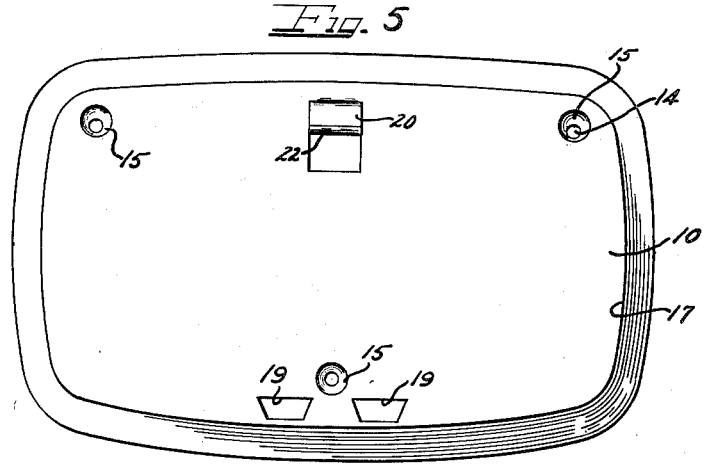
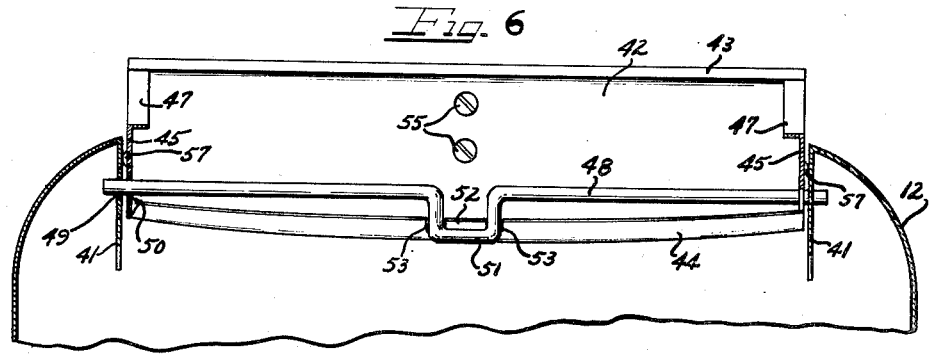
Inventor
JOHN VISSER Patented Sept. 22, 1953

2,652,944

UNITED STATES PATENT OFFICE 2,652,944

ASH RECEIVER

John Visser, Grand Rapids, Mich., assignor to F. L. Jacobs Co., Detroit, Mich., a corporation of Michigan Application July 29, 1947, Serial No. 764,327

1 Claim. (Cl. 220—18)

This invention relates to improvements in ash receivers and more particularly to a novel ash receiver of the kind adapted to be mounted upon the instrument or dash panel of an automobile.

An important object of the invention is to provide an ash receiver which is adapted to be mounted as a convenient accessory on the dash panel of an automobile or the like.

Another object of the invention is to provide an improved ash receiver comprising readily separable mounting panel and ash receptacle components.

A further object of the invention is to provide a novel ash receiver adapted to be mounted upon the dash panel of an automobile or the like and which includes a receptacle portion which is readily detachable for cleaning purposes.

Still another object of the invention is to provide an improved ash receiver having a novel receiving door arrangement.

It is another object of the invention to provide a novel ash receiver which is composed of a minimum number of easily assembled parts affording an efficient, large capacity, economical unit which will blend in attractively with the environment such as found on the dash panel of an automobile.

According to the general features of the invention, there is provided an ash receiver unit including a mounting panel adapted to be secured to a support such as the dash panel of an automobile, a receptacle back panel detachably supported by the mounting panel, and a receptacle forming member carried by the backing panel and forming therewith a relatively large capacity receptacle for ashes from smokers' articles and smokers' article stubs, match sticks and the like, the receptacle forming member having a door at the top thereof which can be selectively opened for the deposit into the receptacle of the ashes and other smokers' refuse.

Another object of the invention resides in the provision of means for detachably connecting the mounting panel and the back panel and which includes a portion thereof projecting into the receptacle and accessible through the opened door for quenching a smoker's article.

A further feature of the invention resides in the provision of novel means for hingedly mounting the door on the receptacle member comprising a rod axle which is detachably interconnected at an intermediate point with the door to hold the rod axle against longitudinal displacement.

According to other general features of the invention, there is provided in an ash receiver for use in an automobile or the like, a backing panel and a receptacle member both of which are formed as separate sheet metal stampings, the margin of the receptacle member being formed with a flange structure interconnected with the margin of the backing panel, and the backing panel having means thereon for removably mounting the same upon a support, whereby the assembly can be readily removed for discharging the contents.

Other objects, features and advantages of the present invention will be readily apparent from the following detailed description of a preferred embodiment thereof, taken in conjunction with the accompanying drawings, in which:

Figure 1 is a front elevational view of an ash receiver according to the present invention;

Figure 2 is a vertical sectional view taken substantially on the line II—II of Figure 1;

Figure 3 is a vertical sectional view similar to Figure 2, but showing the components of the receiver in partially separated condition;

Figure 4 is a rear elevational view of the receptacle portion of the receiver assembly;

Figure 5 is a front elevational view of the mounting panel of the device; and

Figure 6 is a horizontal sectional view taken substantially on the line VI—VI of Figure 3.

With particular reference to Figures 1, 2 and 3, the ash receiver comprises but a minimum of simple, easily assembled principal components which can be inexpensively fashioned as by stamping the same from suitable gauge sheet metal. Such principal components comprise a mounting panel 10, a backing panel 11 and a receptacle member 12.

The mounting panel 10 is formed with a rearwardly turned marginal flange structure 13 for reinforcement and finishing purposes, and the general shape of the panel in plan is preferably rectangular with the edges slightly arcuate to enhance the appearance. In vertical section the mounting plate 10 may be shaped to accommodate the contour of an automobile dash panel or the like (not shown) to which the mounting panel is adapted to be applied. For convenience in mounting the panel 10, it is preferably formed with screw holes or apertures 14 provided with countersunk inset flanges 15, the apertures being formed at appropriately spaced positions sufficiently inwardly from the edges of the panel to be concealed by the backing panel 11 in the assembled condition of the device.

The backing panel 11 is formed to conform to the outer face of the mounting panel 10 and is of a uniformly smaller size so that it will fit within a symmetrical inset 17 in the mounting panel 10.

For removably assembling the backing panel 11 with the mounting panel 10, the backing panel 11 is formed with a pair of integral lower edge engagement tongues or fingers 18 which are disposed in spaced relation at opposite sides of the vertical center of the panels and adapted to engage in appropriate openings 19 adjacent to the lower margin of the mounting panel 10. As best seen in Figures 2, 4 and 5 the engagement fingers 18 are formed to extend rearwardly a short distance and then obliquely downwardly whereby in assembly within the openings 19 the rearward portions of the tongues seat upon the lower edges of the openings 19. Furthermore, the openings 19 are formed wider at the top so as to facilitate entry of the retaining fingers 18 therein, and the lower portions of the openings are narrower to approximately the same width as the fingers 18 so that the fingers seating on the lower edges of the openings will be held substantially against transverse movement or rattling.

As shown in Figure 3, the fingers 18 are adapted to be inserted into the openings in the mounting panel 10 and the back panel 11 thereafter swung into fully assembled relationship with the mounting panel 10. In such fully assembled relationship an outwardly or forwardly projecting latch tongue 20 formed integrally with the mounting panel 10 and struck out therefrom is engageable with a latch member 21 on the backing plate 11. As best seen in Figures 2 and 3, the latching tongue 20 extends obliquely downwardly and has a turned back reinforcing and cam edge flange 22.

By preference, the latch member 21 is formed as a separate element including a supporting leg 23 which is adapted to be held in mounted relation at the back side of the back panel 11 (Fig. 4) by means of integral retaining lugs 24 struck out from the back panel 11 and turned over onto the leg 23 in assembly. To hold the leg 23 against longitudinal movement, it is preferably notched out as indicated at 25 to receive the lugs 24. At its upper end, the leg 23 is formed wtih an integral cam and latch head including a rearwardly oblique reinforcing neck flange 27, a forwardly and upwardly oblique cam flange 28, and a latching flange 29 extending obliquely downwardly and, as shown in Fig. 3, interengageable with the latching tongue 20 for holding the back panel 11 in the assembled relationship. Thus, when the back panel 11 has been preliminarily assembled with the mounting panel 10 by insertion of the retaining fingers 18 in the openings 19, and the back panel 11 is then swung toward the mounting panel 10, the cam flange 28 engages the latching tongue 20 and springs slightly upwardly and past the juncture peak or nose between the cam flange 28 and the latch flange 29. The latch tongue 20 then snaps over into engagement with the latch flange 29 and yieldably, but firmly, holds the back panel in place against the mounting panel 10. To clear the latch members 20 and 21 therethrough, the back panel 11 is formed with an appropriately dimensioned opening 30.

The receptacle member 12 is carried entirely by the back panel 11 and cooperates therewith to provide a receptacle 31 for receiving ashes and other smokers' refuse through an opening 32 provided for this purpose in the upper part of the receptacle member 12. To this end, the receptacle member 12 comprises a plate which is bulged outwardly and with margins only slightly greater than the dimensions of the back plate 11, the bottom margins of the receptacle member being formed with an angular rearwardly facing seating flange 33 which interengages with a complementary angular seating flange 34 about the margin of the back plate 11. The flanges 33 and 34 are preferably in the nature of rabbets so that when the back panel 11 and the receptacle member 12 are preliminarily assembled they will be held in mutually interengaging alignment. For maintaining a more or less permanent assembled relationship of the back member 11 and the receiving member 12, the margin of the receiving member 12 is formed along its upper edge with a turned connecting flange 35 which clamps the upper edge of the back panel 11 and the lower edge of the receiving member may be upset at intervals as indicated at 37 (Fig. 4) to provide integral connecting lugs which engage behind the marginal flange 34 of the back panel 11.

The forward and rear edges of the opening 32 are preferably defined by turned under reinforcing and finishing flanges 38 and 39, respectively. At the sides of the opening 32 are provided reinforcing flanges 40, each of which is substantially extended inwardly to provide a supporting ear 41 for a closure member or door 42. The flanges 40 and the ears 41 are formed from the material of the member 12 which is struck out in the formation of the receiving opening 32.

The closure or door member 42 (Figs. 2, 3 and 6) may be formed from appropriate sheet metal fashioned to provide a door panel which is of a size and shape to provide a substantially flush substitute for that portion of the receptacle member 12 which was removed for the access opening 32. Marginally the door member or panel is formed with forward and rear inturned reinforcing flanges 43 and 44, respectively, while the opposite ends are reinforced by relatively large bearing ears 45 which are, in turn, formed with inturned reinforcing flanges 47.

For pivoting the door 42, an axle rod 48 extends between and through the side or bearing ears 45 of the door and having the extremities thereof journalled in appropriate bearing apertures 49 in the ears 41, the bearing ears 45 being formed with appropriate apertures 50 for this purpose. By having the axle rod 48 formed shorter than the adjacent inside dimension of the receptacle member 12, it is possible to assemble the rod with the door 42 and the member 12 by extending one end thereof through the respective apertures 50 and 49 to a sufficient extent to clear the opposite end for projection through the aperture 50 in the adjacent bearing ear 45 and then into the journal aperture 49 of the contiguous ear 41.

In order to hold the bearing rod 48 against longitudinal displacement, it is preferably formed with an intermediate interlock loop 51 which is engaged in final assembly with an interlock tongue 52 formed in the flange 44 of the door, the tongue being provided by appropriately notching the flange 44 as indicated at 53. The interlock loop 51 is held against the interlock tongue 52 by reason of a spring interengagement thereof.

To facilitate manipulation of the door 42 to swing the same from closed full line position as shown in Figures 1 and 2 to the open position as shown in dash outline in Figure 2 and in full outline in Figure 3, a handle lug 54 of appropriate design may be provided for the center portion of the door, the handle being secured in place as by means of screws 55 tapped thereinto and applied from the inside of the door.

In order to hold the door 42 against free swinging about its pivot, means are preferably provided such as outwarly pressed dimples 57 which bear frictionally against the opposing faces of the ears 41 and thus afford frictional restraint upon free swinging movement of the door. Yet the door can be swung conveniently by manipulation of the handle 54.

Outturned stop ears 57a are formed on the inner ends of the flanges 47 to limit full opening movement of the door 42.

A quencher or snuffer is provided in the form of an integral extension on the latch member 21 comprising a terminal flange portion 58 extending from the latching flange 29 and formed with a snuffing eye 59 accessible through the opening 32 when the door 42 is open for application thereagainst of the burning tip of a smoker's article which by manipulation against the eye 59 can be disintegrated and snuffed out, the ashes and refuse dropping down into the receptacle 31.

The exposed surfaces of the mounting panel 10, and the receptacle member 12 as well as the door 42 and the handle 54 may be appropriately finished as by plating and polishing to present a smooth, attractive surface in keeping with the environment in which the device is to be used.

It will be apparent that when it is desired to dispose of the contents of the receptacle 31, it is a simple matter to disengage the receptacle assembly comprising the back panel 11 and the receiver 12 by withdrawing the latch member 21 from the latch tongue 20, pivoting the receptacle assembly outwardly and withdrawing the retaining tongues or fingers 18 from the back panel, whereafter the contents of the receptacle 31 can be dumped. Reassembly of the unit is easily and quickly accomplished, merely by returning the fingers 18 to their receiving apertures 19 and snapping the top of the back panel 11 back into the assembled relationship by interengaging the latch members 20 and 21.

It will, of course, be understood that various details of construction may be varied through a wide range without departing from the principles of this invention and it is, therefore, not the purpose to limit the patent granted hereon otherwise than necessitated by the scope of the appended claim.

I claim as my invention:

In combination in an ash receptacle of the character described, mounting structure having a contour approximating that of the surface to which said receiver is to be secured, a receptacle structure including a back panel, said back panel having an opening adjacent to the top thereof, means adjacent the bottom of the receptacle structure for effecting preliminary engagement with the mounting structure, a latch arm extending from the mounting structure and projectable through said aperture in the finally assembled relationship of the receptacle structure with the mounting structure, and a latch member carried by the back panel and having a mounting leg secured to the rear of the back panel and a latch head projecting through said aperture and engageable with said latch arm.

JOHN VISSER.

References Cited in the file of this patent

UNITED STATES PATENTS

| Number | Name | Date |
|---|---|---|
| 829,070 | Hansen | Aug. 21, 1906 |
| 1,093,033 | Canby | Apr. 14, 1914 |
| 1,371,193 | Berge | Mar. 8, 1921 |
| 1,533,497 | Hermani | Apr. 14, 1925 |
| 1,556,353 | Roedding | Oct. 6, 1925 |
| 1,645,772 | Pittelkow | Oct. 18, 1927 |
| 1,646,266 | Stoner | Oct. 18, 1927 |
| 1,676,621 | Pittelkow | July 10, 1928 |
| 1,802,947 | Kimball | Apr. 28, 1931 |
| 1,815,101 | Goldstein | July 21, 1931 |
| 1,863,988 | Kupfer | June 21, 1932 |
| 1,994,933 | Visser | Mar. 19, 1935 |
| 2,046,107 | De Boer | June 30, 1936 |
| 2,120,038 | O'Neil | June 7, 1938 |
| 2,159,061 | Visser | May 23, 1939 |
| 2,182,813 | Mann et al. | Dec. 12, 1939 |
| 2,196,372 | Visser | Apr. 9, 1940 |
| 2,221,959 | Visser | Nov. 19, 1940 |
| 2,267,156 | Johnson | Dec. 23, 1941 |
| 2,311,968 | Schallis | Feb. 23, 1943 |
| 2,445,914 | Hendricks | July 27, 1948 |